US006864642B2

(12) United States Patent
Nemirow et al.

(10) Patent No.: US 6,864,642 B2
(45) Date of Patent: Mar. 8, 2005

(54) ELECTRONIC BALLAST WITH DC OUTPUT FLYBACK CONVERTER

(75) Inventors: Arthur T. Nemirow, Carson City, NV (US); Storm S Sears, Dayton, NV (US)

(73) Assignee: Bruce Industries, Inc., Dayton, NV (US)

(*) Notice: Subject to any disclaimer, the term of this patent is extended or adjusted under 35 U.S.C. 154(b) by 0 days.

(21) Appl. No.: 10/266,162

(22) Filed: Oct. 7, 2002

(65) Prior Publication Data

US 2004/0066153 A1 Apr. 8, 2004

(51) Int. Cl.[7] .............................................. H05B 37/02

(52) U.S. Cl. ................... 315/224; 315/209 R; 315/291; 315/307

(58) Field of Search .............................. 315/219, 224, 315/291, 306, 307, 308, 209 R, 247, 248, 276

(56) References Cited

U.S. PATENT DOCUMENTS

| 3,700,960 A | 10/1972 | Lake | ........................ 315/151 |
| 3,967,159 A | 6/1976 | Dendy et al. | ............... 315/247 |

(List continued on next page.)

OTHER PUBLICATIONS

Mammano, Robert, Switching Power Supply Topology Voltage Mode vs. Current Mode, UNITRODE Design Note, DN–62, 10/94, pp. 1–4.
UNITRODE Advanced Regulating Pulse Width Modulator SLUS181A–Nov. 1999, pp. 1–7.
UNITRODE Current Mode PWM Controller, 4/97 pp. 1–8.
UNITRODE Regulating Pulse Width Modulators, 2/96, pp. 1–8.
UNITRODE Application Note U–112, A High Precision PWM Transconductance Amplifier for Microstepping Using Unitrode's UC3637, pp. 3–124–3–132.
UNITRODE Application Note U–102, UC1637/2637/3637 Switched Mode Controller for DC Motor Drive, pp. 3–67–3–78.
Unitrode Products from Texas Instruments, Advanced PWM Motor Controller, SLUS290A–Jan. 1998, Revised Jan. 2003, pp. 1–9.
UNITRODE Application Note U–100A, UC3842/3/4/5 Provides Low–Cost Current–Mode Control, pp. 3–53–3–66.
Zendzian Dave, Class–D Audio Amplifier, Unitrode, pp. 1–7.
Constant Current/Constant Power Regulation Circuits for TOPSwitch® Design Note DN–14, Jun. 1996, pp. 1–16.
TOP242–250 TOPSwitch®–GX Family, Extended Power, Design Flexible, EcoSmart®, Integrated Off–Line Switcher, Sep. 2002, pp. 1–52.
TOP232–234 TOPSWITCH®–FX Family, Design Flexible, EcoSmart®, Integrated Off–Line Switcher, Power Integrations, Inc., Jan. 2000pp. 1–36.

*Primary Examiner*—Wilson Lee
*Assistant Examiner*—Jimmy T Vu
(74) *Attorney, Agent, or Firm*—Brooks Kushman P.C.

(57) ABSTRACT

A fluorescent lamp electronic ballast includes a DC to DC flyback converter, a commutator circuit, and a current sensor. The flyback converter includes a flyback transformer connected to a diode/capacitor combination, and includes a switch used to produce a flyback waveform that is rectified by the diode and results in a high voltage DC output at the capacitor. The commutator circuit receives the high voltage DC output and converts the high voltage DC output to an AC signal for operating the fluorescent lamp. The current sensor senses a DC lamp current from the output of the flyback converter and provides a current sense signal to the flyback converter. The flyback converter switch is controlled based on the current sense signal. Preferred ballasts advantageously provide a continuously dimmable lamp load, a universal type ballast for a wide range of lamp loads and combinations, and programmed start.

6 Claims, 5 Drawing Sheets

U.S. PATENT DOCUMENTS

| | | | |
|---|---|---|---|
| 3,969,652 A | 7/1976 | Herzog | 315/224 |
| 3,991,344 A | 11/1976 | Tabor | 315/198 |
| 3,999,100 A | 12/1976 | Dendy et al. | 315/308 |
| 4,004,188 A | 1/1977 | Cooper | 315/261 |
| 4,184,197 A | 1/1980 | Cuk et al. | 363/16 |
| 4,240,009 A | 12/1980 | Paul | 315/224 |
| 4,251,752 A | 2/1981 | Stolz | 315/206 |
| 4,277,726 A | 7/1981 | Burke | 315/98 |
| 4,358,716 A | 11/1982 | Cordes et al. | 315/306 |
| 4,388,563 A | 6/1983 | Hyltin | 315/205 |
| 4,392,085 A | 7/1983 | Knoll et al. | 315/173 |
| 4,412,154 A | 10/1983 | Klein | 315/224 |
| 4,415,839 A | 11/1983 | Lesea | 315/308 |
| 4,464,606 A | 8/1984 | Kane | 315/158 |
| 4,469,988 A | 9/1984 | Cronin | 315/209 R |
| 4,477,748 A | 10/1984 | Grubbs | 315/306 |
| 4,485,434 A | 11/1984 | Beeston et al. | 363/132 |
| 4,504,775 A | 3/1985 | Becker | 320/140 |
| 4,523,128 A | 6/1985 | Stamm et al. | 315/291 |
| 4,672,522 A | 6/1987 | Lesea | 363/48 |
| 4,700,113 A | 10/1987 | Stupp et al. | 315/224 |
| 4,723,098 A | 2/1988 | Grubbs | 315/306 |
| 4,724,360 A | 2/1988 | Luursema | 315/241 |
| 4,870,327 A * | 9/1989 | Jorgensen | 315/307 |
| 4,873,616 A | 10/1989 | Fredrick et al. | 363/17 |
| 4,873,617 A | 10/1989 | Fredrick et al. | 363/17 |
| 4,949,015 A | 8/1990 | Nilssen | 315/106 |
| 4,958,108 A | 9/1990 | Jorgensen | 315/307 |
| 5,363,020 A * | 11/1994 | Chen et al. | 315/209 R |
| 5,416,387 A | 5/1995 | Cuk et al. | 315/209 R |
| 5,428,268 A | 6/1995 | Melis et al. | 315/247 |
| 5,449,981 A | 9/1995 | Auld, Jr. et al. | 315/308 |
| 5,483,127 A | 1/1996 | Widmayer et al. | 315/307 |
| 5,698,952 A * | 12/1997 | Stebbins | 315/307 |
| 5,814,976 A | 9/1998 | Allison | 323/224 |
| 5,969,484 A | 10/1999 | Santi et al. | 315/247 |
| 6,680,582 B1 | 1/2004 | Cammack | 315/224 |
| 2002/0113559 A1 * | 8/2002 | Lam | 315/224 |
| 2002/0135320 A1 | 9/2002 | Kominami et al. | 315/209 R |
| 2002/0153849 A1 | 10/2002 | Ribarich | 315/209 R |
| 2003/0222713 A1 | 12/2003 | Kominani et al. | 315/209 R |

* cited by examiner

ELECTRONIC BALLAST WITH DC OUTPUT FLYBACK CONVERTER

BACKGROUND OF THE INVENTION

1. Field of the Invention

The present invention relates to fluorescent lamps and to electronic ballasts of the type utilizing a DC output flyback converter.

2. Background Art

The use of fluorescent lamps has become widespread. The typical fluorescent lamp is composed of a glass tube containing an inert gas and a small amount of mercury. Phosphors coat the inside of the glass tube, and each end of the glass tube includes an electrode. In operation, a ballast provides current to the electrodes. A traditional ballast is a special transformer that uses electromagnetic principles to generate operating and starting voltages for fluorescent lamps. An electronic ballast uses electronics to achieve the same result. In operation, electrons migrate across the length of the tube, and excite the mercury atoms which are in a gaseous state. The arc releases photons in the ultraviolet band. The photons excite the phosphors that coat the inside of the glass tube, and the phosphors emit visible light. Fluorescent lamps are very efficient during operation. Before a fluorescent lamp can operate as described above, the lamp must be started, that is, the length of tube must be made conductive. There are several existing techniques for starting a fluorescent lamp.

One technique for starting a fluorescent lamp involves the use of electrodes that include filaments. Each electrode is composed of two conductive pins that connect to a filament wire including tungsten and boron. Preheating the filament at each end of the fluorescent lamp tube boils electrons from the filament to ionize the gas inside the tube. The ionized gas inside the glass tube is conductive, and needs a voltage across the electrodes to establish an electrical arc. Using preheating techniques for the filaments increases lamp life, enhances dimming performance and enhances cold operation performance.

Another technique for starting a fluorescent lamp is known as instant start. In instant start fluorescent lamps, a very high initial voltage is applied across the electrodes which are typically single pin electrodes. The high voltage causes a corona discharge where the gas inside the glass tube is quickly ionized and an electrical arc is established.

Background information relating to ballasts may be found in U.S. Pat. Nos. 4,958,108; 4,870,327; 5,969,484; 5,416, 387; 4,184,197; 5,449,981; 5,428,268; and 5,814,976. In the operation of fluorescent lamps, two important operating parameters are crest factor and power factor. There is always a desire to make an electronic ballast that is more cost effective, and has improved operating parameters.

For the foregoing reasons, there is a need for an improved electronic ballast of the type having a DC output flyback converter.

SUMMARY OF THE INVENTION

It is, therefore, an object of the present invention to provide an improved fluorescent lamp electronic ballast that utilizes a DC output flyback converter.

In carrying out the above object, a fluorescent lamp electronic ballast is provided. The electronic ballast comprises a DC to DC flyback converter, a commutator circuit, and a current sensor. The flyback converter includes a flyback transformer connected to a diode/capacitor combination, and includes a switch used to switch the flyback transformer to produce a flyback waveform that is rectified by the diode and results in a high voltage DC output at the capacitor. The commutator circuit receives the high voltage DC output and converts the high voltage DC output to an AC signal for operating the fluorescent lamp. The current sensor senses a DC lamp current from the output of the flyback converter and provides a current sense signal to the flyback converter. The flyback converter switch is controlled based on the current sense signal.

It is appreciated that the DC to DC flyback converter may take any suitable form. For example, the switch may be a part of a pulse width modulator (PWM) integrated circuit package for providing enhanced converter control. It is appreciated that the commutator circuit may take any suitable form. For example, an H-bridge may be switched to convert the high voltage DC output to the AC signal for operating the fluorescent lamp. It is to be appreciated that the current sensor may take any suitable form. For example, the current sensor may be a current sensing resistor.

Preferably, the electronic ballast further comprises control logic for comparing the current sense signal to a setpoint. The flyback converter switch is controlled to cause the current sense signal to track the setpoint. The setpoint and control logic preferably dictate that the high voltage flyback output current is a constant DC current. This approach allows precise control over lamp crest factor. It is appreciated that the control logic may take any suitable form. For example, an operational amplifier may be arranged to provide the desired feedback control, or alternatively, a microprocessor or microcontroller may provide the desired feedback control.

Preferably, the electronic ballast further comprises control logic for detecting an error condition and turning off the flyback converter switch in the presence of the error condition. It is appreciated that the control logic may take any suitable form. For example, a microprocessor, a microcontroller, or discrete and/or integrated components may provide the needed control.

Preferably, the electronic ballast further comprises control logic for detecting lamp voltage prior to lamp ignition and controlling the flyback converter switch at a minimum duty cycle prior to lamp ignition. It is appreciated that the control logic may take any suitable form. For example, a microprocessor, a microcontroller, or discrete and/or integrated components may provide the needed control.

The above object and other objects, features, and advantages of the present invention are readily apparent from the following detailed description of the preferred embodiments when taken in connection with the accompanying drawings.

DETAILED DESCRIPTION OF THE PREFERRED EMBODIMENT

Figure 1:
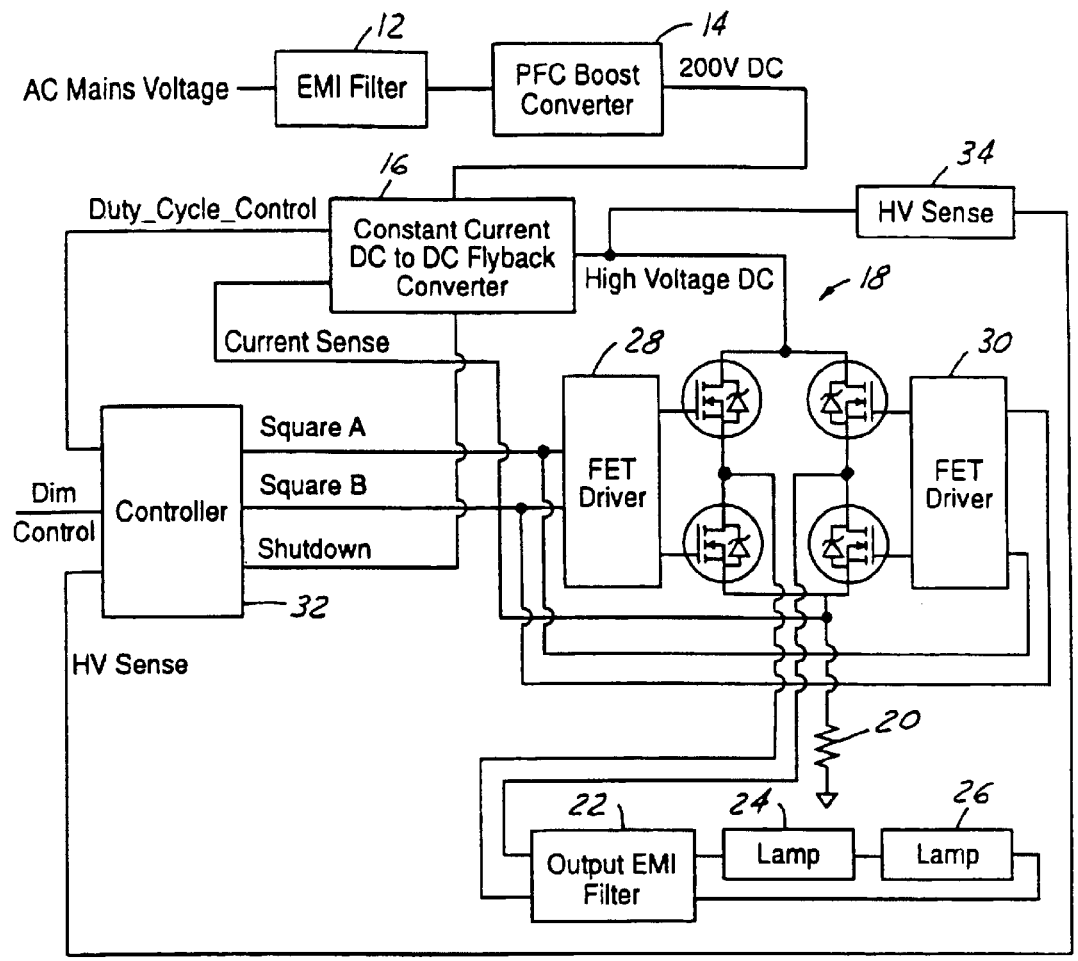
FIG. 1 is a block diagram of an exemplary electronic ballast in accordance with the present invention.

FIG. 1 illustrates a fluorescent lamp electronic ballast at the functional level. The electronic ballast receives the AC mains voltage, which is processed by EMI filter 12 and power factor boost converter 14 to produce a 200 V DC signal. DC to DC flyback converter 16 is configured to provide a high voltage DC constant current output during lamp operation. H-bridge circuit 18, which includes MOS-FETs and FET drivers 28 and 30, commutates the DC voltage to produce an AC signal for driving the lamps. DC current is sensed with sensing resistor 20 to provide a current sense feedback signal to flyback converter 16. The AC signal is processed by output EMI filter 22, and then drives lamps 24 and 26.

Figure 2:
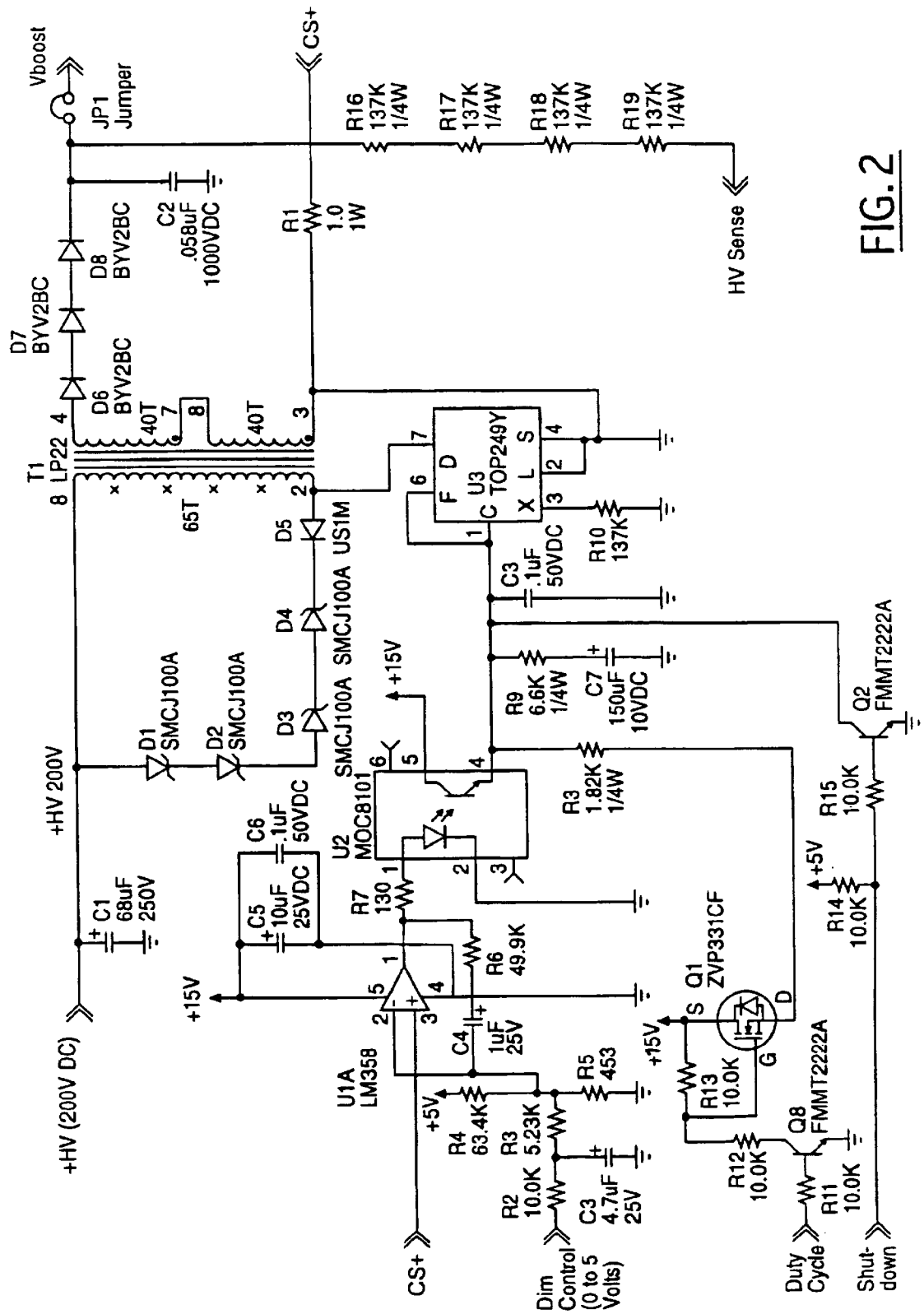
FIG. 2 is an exemplary constant current flyback schematic diagram in accordance with the present invention.
Figure 3:
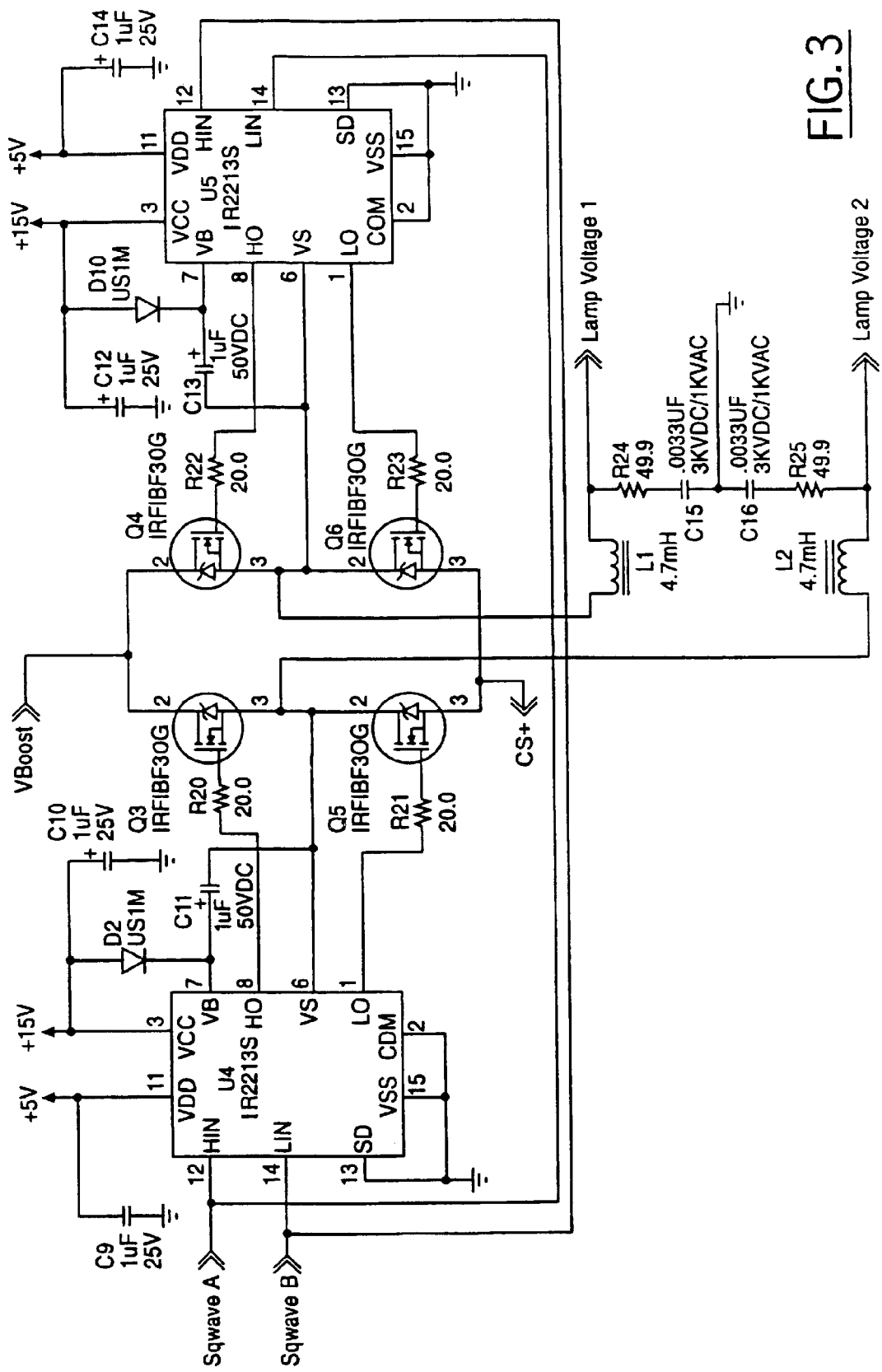
FIG. 3 is an exemplary H-bridge schematic diagram in accordance with the present invention.
Figure 4:
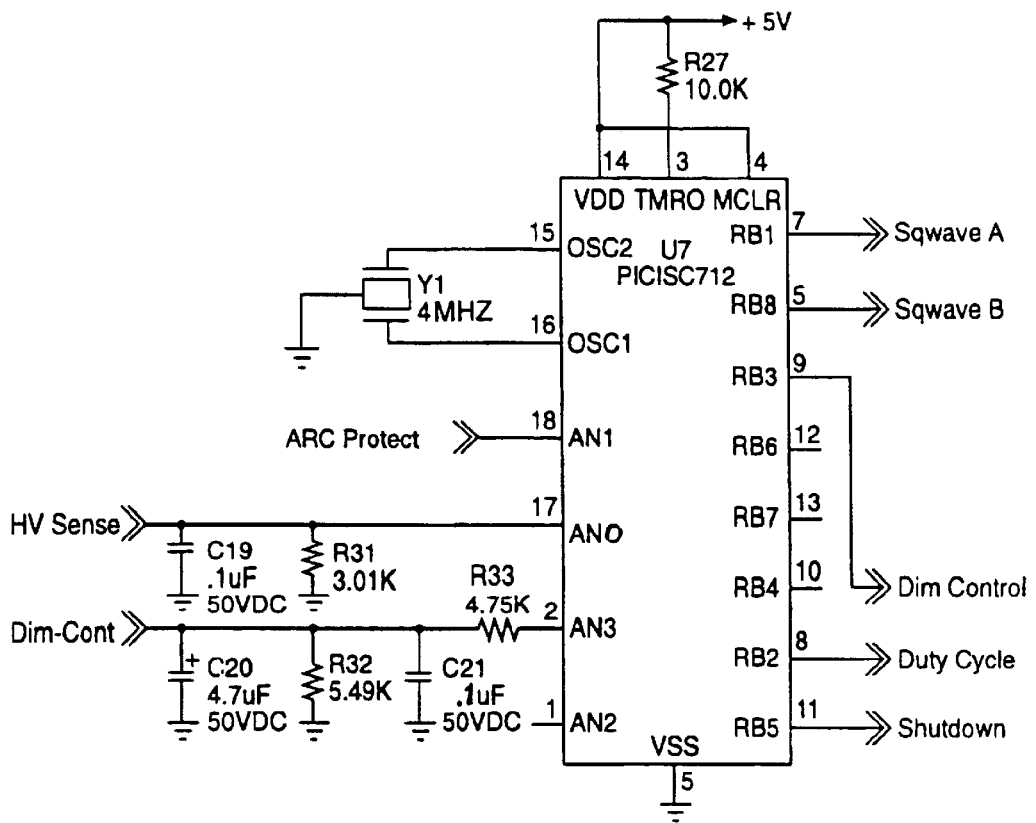
FIG. 4 is an exemplary PIC microcontroller schematic in accordance with the present invention.

A controller 32 provides a duty cycle control reference signal to flyback converter 16, which is compared to the current sense signal to allow the flyback converter 16 to provide a constant current output. Controller 32 drives FET drivers 28 and 30 to control commutation and produce the low frequency AC signal that drives the lamps. Controller 32 is also provided with an additional input signal indicative of the high voltage signal from high voltage sense block 34, receives a dimming control input, and has a shutdown output that is provided to flyback converter 16. FIGS. 2–4 illustrate the electronic ballast at the circuit level.

As shown in FIG. 2, the major components of the constant current flyback are T1, the flyback transformer and U3, a TOP249Y Top Switch from Power Integrations, Inc. Key factors in the design of the flyback transformer include an elongated bobbin with interleaved primary and secondary windings. These techniques are used to minimize leakage inductance effects in the winding. The primary of the flyback transformer is supplied with a 200 volt DC potential, which is developed from the AC line via a power factor correction and boost circuit. Development of the flyback waveform is accomplished under switching control of the Top Switch, which incorporates a low resistance power FET. A pulse width modulation scheme is used to switch the flyback in the continuous mode; thus, minimizing the EMI generated by this circuit. A snubber network composed TVS diodes D1–D4, and ultrafast diode D5, prevents damage to the switching FET during the flyback period.

The flyback waveform developed on the secondary of T1, is rectified by diodes D6, D7, and D8, and filtered by a capacitor C2, producing a DC level. This DC potential is then applied to a conventional H-Bridge switching network, refer to FIG. 3, which converts the DC potential to a low frequency AC signal that can be used to ignite a fluorescent lamp.

Control of the Top Switch is implemented on the control pin, U3-1. This control pin provides multiple functions for lamp startup, operation, and error detection modes. Both voltage and current are sensed. To implement feedback control of the flyback circuit via pulse width modulation, current control on the control pin is utilized. To implement these functions on a single pin, and isolate the voltage potentials being generated by the Top Switch from the rest of control circuitry, an optoisolator, U2, is employed for level shifting.

The control loop for the Top Switch is implemented using a single Op Amp, U1, configured as a PID (proportional, integral, derivative) controller. This circuit develops an error current which is proportional to the deviation from a setpoint. Current on the output side of the flyback circuit is monitored via the voltage developed across current sense resistor R1, which is fed to one input of the PID controller. This voltage potential is then compared to the command voltage, or dim level, which in this case, is being supplied by the PWM output of a PIC microcontroller IC, U7, (refer to FIG. 4).

On/Off or shutdown control of the flyback circuit is effected in response to a number of potential error modes. In the case of an overload condition, or shorting of the flyback output, the Top Switch contains a built-in overcurrent protection circuit which halts the switching circuit. Adjustment of this overcurrent setpoint is made via resistor R10. Other error conditions such as a sustained open circuit condition, no output, or excessive variation in the output, are sensed via the PIC microcontroller, U7, which is fed a divided down sample of the output voltage via resistor network R16–R19. The PIC microcontroller will then shut down the Top Switch by pulling the control pin (U3-1) to ground via R14, R15, and Q2.

To effect lamp ignition, it is first necessary to apply a high voltage potential to the lamp. Subsequent to ignition, the voltage potential across the lamp will drop dramatically. This event must be sensed and current loop regulation can then commence. In this circuit, this lamp ignition and regulation sequence is handled in the following manner:

1. Prior to ignition, the filaments on the lamp are preheated. The high voltage output from the flyback is held off by the Shutdown signal from the PIC microcontroller, U7.
2. After preheat, the Shutdown signal goes low, allowing the Top Switch to commence operation. The output of the flyback immediately rises to the open circuit maximum potential which is approximately 650 volts DC. Because the lamp has not ignited yet and there is essentially no load on the power supply, all of the open circuit potential is reflected back to the primary of flyback transformer T1. This condition could be potentially damaging to the transient voltage suppressor (TVS) diode snubber circuit on the primary of T1. Therefore, it is necessary to limit the switching duty cycle to minimum during this period to limit the current through these diodes. This is effected via the PIC microcontroller and components R11–R13, Q8 and Q1. When the Duty Cycle signal from the microcontroller is high, maximum control current is applied to the control pin, U3-1, of the Top Switch forcing it into a minimum pulse width switching mode.
3. After the lamp ignites, the voltage potential on the DC output bus drops dramatically. This event is sensed by the PIC microcontroller via the HV Sense feedback network. The PIC then sets the Duty Cycle control signal to low, thus enabling full range, current feedback control.

Figure 5:
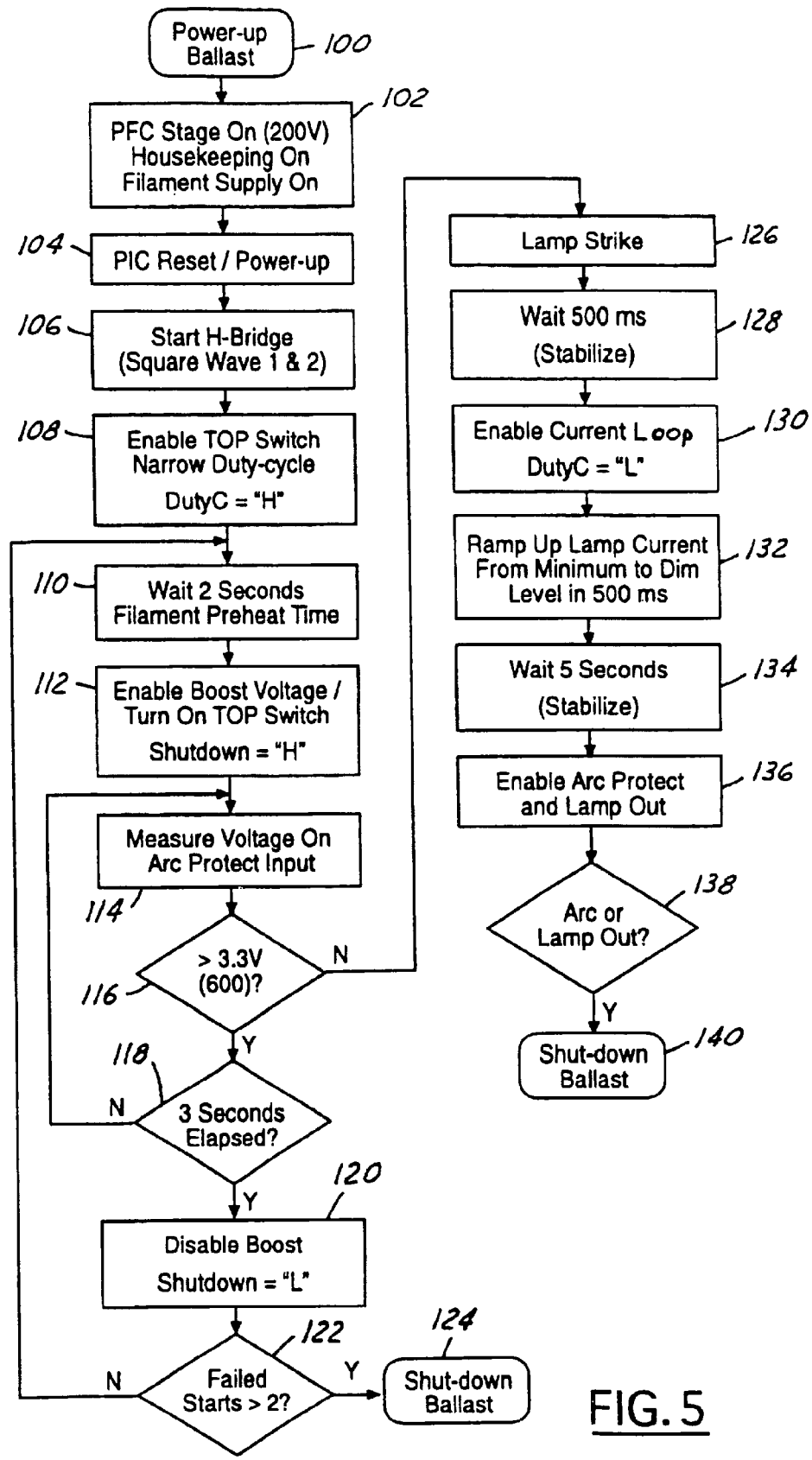
FIG. 5 is a flow chart illustrating operation of the electronic ballast illustrated in FIGS. 1–4.

FIG. 5 shows the general flow of the lamp ignition and regulation sequence. The ballast is powered up at block 100. At block 102, the power factor correction circuit, filament supply and housekeeping (not shown) are powered up. At blocks 104, 106, 108, the PIC microcontroller is reset, the H-bridge is started, and the Top switch is started. Preheat occurs at block 110. Blocks 112, 114, 116, 118 illustrate the lamp ignition process. More specifically, the shutdown signal goes high at block 112 allowing open circuit voltage to rapidly rise, and then drop on ignition causing flow to proceed to block 126. Blocks 120, 122, 124 handle a failed ignite attempt. Block 128 allows the lamps to stabilize, while block 130 enables the current feedback control. Lamp current ramps up at block 132 and then stabilizes at block 134. At block 136, the arc protection is enabled and block 138 checks the high voltage signal with the controller to detect a potential open circuit or lamp out which is indicated by an increase in the high voltage. Block 140 shuts down if an arc or lamp or open circuit is detected.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluorescent lamp electronic ballast comprising:
    a PFC stage providing an essentially level output DC voltage;
    a DC to DC flyback converter receiving the PFC stage output DC voltage and including a flyback transformer connected to a diode/capacitor combination, and including a switch used to switch the flyback transformer to produce a flyback waveform that is rectified by the diode and results in an essentially level high voltage DC output at the capacitor;
    a commutator circuit receiving the high voltage DC output and converting the high voltage DC output to an AC signal for operating the fluorescent lamp; and
    a current sensor for sensing a DC lamp current from the output of the flyback converter and providing a current sense signal to the flyback converter, wherein the flyback converter switch is controlled based on the current sense signal to control the DC lamp current.

2. The fluorescent lamp electronic ballast of claim 1 further comprising:
    control logic for comparing the current sense signal to a setpoint and controlling the flyback converter switch to cause the current sense signal to track the setpoint.

3. The fluorescent lamp electronic ballast of claim 2 wherein the setpoint and control logic dictate that the high voltage flyback output current is a constant DC current.

4. The fluorescent lamp electronic ballast of claim 1 further comprising:
    control logic for detecting an error condition and turning off the flyback converter switch in the presence of the error condition.

5. The fluorescent lamp electronic ballast of claim 1 further comprising:
    control logic for detecting lamp voltage prior to lamp ignition and controlling the flyback converter switch at a minimum duty cycle prior to lamp ignition.

6. The fluorescent lamp electronic ballast of claim 1 wherein the commutator circuit is an H-bridge.

* * * * *